US008908502B2

(12) United States Patent
Hayashitani

(10) Patent No.: US 8,908,502 B2
(45) Date of Patent: Dec. 9, 2014

(54) COMMUNICATION SYSTEM, NODE DEVICE, COMMUNICATION METHOD IN THE COMMUNICATION SYSTEM, AND PROGRAM

(75) Inventor: Masahiro Hayashitani, Tokyo (JP)

(73) Assignee: NEC Corporation, Tokyo (JP)

( * ) Notice: Subject to any disclaimer, the term of this patent is extended or adjusted under 35 U.S.C. 154(b) by 109 days.

(21) Appl. No.: 13/063,233

(22) PCT Filed: Sep. 17, 2009

(86) PCT No.: PCT/JP2009/066237
§ 371 (c)(1),
(2), (4) Date: Mar. 10, 2011

(87) PCT Pub. No.: WO2010/038624
PCT Pub. Date: Apr. 8, 2010

(65) Prior Publication Data
US 2012/0099421 A1    Apr. 26, 2012

(30) Foreign Application Priority Data

Oct. 3, 2008 (JP) .................................. 2008-259007

(51) Int. Cl.
| H04L 12/26 | (2006.01) |
| H04L 12/707 | (2013.01) |
| H04L 12/703 | (2013.01) |
| H04L 12/751 | (2013.01) |
| H04L 12/759 | (2013.01) |

(52) U.S. Cl.
CPC .............. *H04L 45/22* (2013.01); *H04L 45/28* (2013.01); *H04L 45/02* (2013.01); *H04L 45/028* (2013.01)
USPC ........................................ 370/221; 370/216

(58) Field of Classification Search
USPC ................................. 370/216, 221
See application file for complete search history.

(56) References Cited

U.S. PATENT DOCUMENTS

| 7,274,869 B1* | 9/2007 | Pan .................................... 398/5 |
| 2003/0179700 A1* | 9/2003 | Saleh et al. ................... 370/216 |
| 2005/0111350 A1* | 5/2005 | Kano ............................. 370/216 |

FOREIGN PATENT DOCUMENTS

| JP | 11-284633 A | 10/1999 |
| JP | 2003124978 A | 4/2003 |

(Continued)

OTHER PUBLICATIONS

International Search Report for PCT/JP2009/066237 mailed Oct. 27, 2009.

*Primary Examiner* — Anh-Vu Ly
*Assistant Examiner* — Hashim Bhatti
(74) *Attorney, Agent, or Firm* — Sughrue Mion, PLLC

(57) ABSTRACT

A communication system comprises: failure detection means that detects a failure on a first transmission path over which data transmission is being performed; transmission path setting means that, when the failure exists in a link or a node that is located immediately before its own node, sets a second transmission path as far as a transmission terminal node, the second transmission path that excludes a path from the transmission terminal node to a node that has detected the failure within the first transmission path; first failure notification means that transmits a failure notification signal as far as the transmission terminal node over the second transmission path; new path switching means that, upon receipt of the failure notification signal, switches a switch for data transmission so that a path for new data transmission is the same path as a transmission path for the failure notification signal; and data transmission means that, upon the transmission terminal node receiving the failure notification signal, switches the switch to the second transmission path and performs a new data transmission over the second transmission path.

10 Claims, 10 Drawing Sheets

(56) References Cited

FOREIGN PATENT DOCUMENTS

| | | | |
|---|---|---|---|
| JP | 2003293633 A | 10/2003 |
| JP | 2004297238 A | 10/2004 |
| JP | 2004304727 A | 10/2004 |
| JP | 2005159434 A | 6/2005 |

* cited by examiner

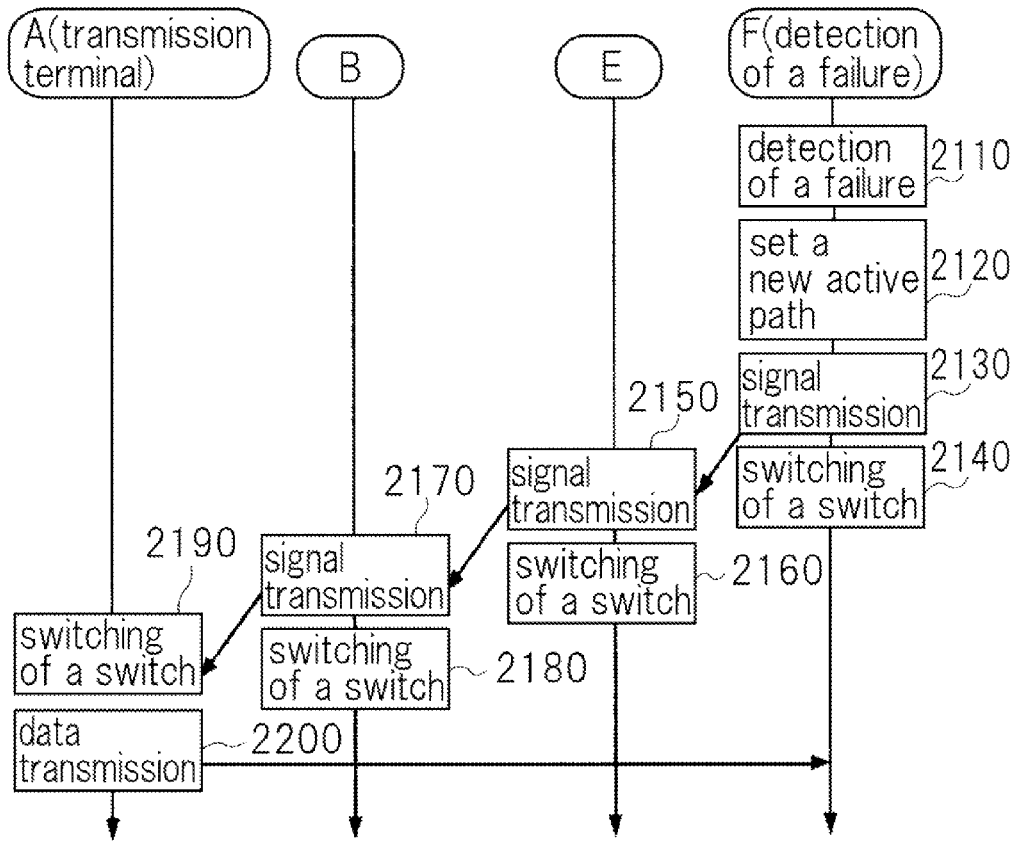
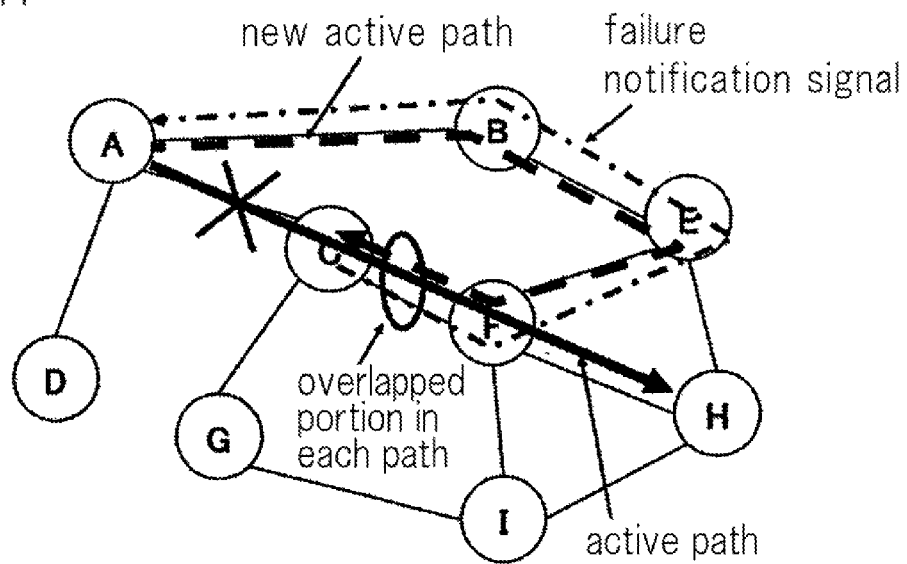

US 8,908,502 B2

COMMUNICATION SYSTEM, NODE DEVICE, COMMUNICATION METHOD IN THE COMMUNICATION SYSTEM, AND PROGRAM

TECHNICAL FIELD

The present invention relates to a communication system, a node device, a communication method in the communication system, and a program which take into consideration a failure recovery of a network.

BACKGROUND ART

Failure recovery techniques are extremely important for communication networks such as a photonic network when considering how to ensure that a network will have high reliability. The term "failure recovery" refers to switching a path from a active path on which a failure has occurred to a standby path when a failure such as a link disconnection or a node failure occurs.

A representative example of a failure recovery technique is 1:1 protection. Since the 1:1 protection technique does not cause data to flow on a standby path during normal operation, the 1:1 protection technique is receiving attention as a method that can make the maximum use of bands when considering the current situation in which increasing amounts of data are being transmitted within networks.

1:1 protection includes cases in which part of a standby path is shared by a plurality of active paths. As shown in FIG. 1, standby path 1' for active path 1 and standby path 2' for active path 2 share the same channel on a link between C and F. In this case, when a failure occurs on active path 1 or on active path 2, because part of the standby path is shared by a plurality of active paths, it is necessary for a node(s) on the standby path to set a pass for the standby path.

In the example illustrated in FIG. 1, nodes C and F are required to set the path for the standby path. A switch within the nodes is set so that data flows on standby path 1' when a failure occurs in active path 1, and flows on standby path 2' when a failure occurs in active path 2.

When part of a standby path is shared by a plurality of active paths, it is thus necessary to set a switch within a node on the standby path in the process of failure recovery. The flow of a conventional failure recovery will now be described.

First, a node on the active path that has detected the failure of the active path, provides notification that a failure has occurred in the transmission terminal node on the active path. Upon receipt of the notification, the transmission terminal node transmits a switch setting request signal as far as the receiving terminal node on the active path along a standby path for the active path on which the failure has occurred. A node that has received the switch setting request signal switches its switch to the standby path. The receiving terminal node on the active path that has received the switch setting request signal last time, switches its switch so that data can be received using the standby path, and then transmits a switch switching completion signal as far as the transmission terminal node on the active path along the standby path. Since switching of switches has been completed at all nodes, excluding the transmission terminal node on the standby path, the transmission terminal node on the active path that has received the switch switching completion signal determines that preparations for sending data on the standby path have been completed. Then, the transmission terminal node on the active path switches its switch from the active path to the standby path and causes data to flow along the standby path. Thus, the failure recovery operation has been completed.

However, the conventional failure recovery is problematic in that the failure recovery can not be performed at a high speed because much time is required in switch settings and in confirming completion of the settings during the failure recovery operation.

In order to achieve a high-speed failure recovery, Patent Literature 1, for example, discloses a technique in which, a node on an active path, which detects the failure of the active path, transmits a failure notification signal through flooding. The term "flooding" herein refers to the fact that a certain node transmits a packet to its all adjacent nodes.

A node that has received the failure notification signal retains therein information regarding all active paths within the network and standby paths that correspond to the active paths. A node that has received the failure notification signal determines from the failure notification signal and the path information whether or not its own node is a node on a standby path corresponding to the active path, the failure of which is detected. If its own node is a node on the standby path, the node switches its switch to the standby path, and transmits the received failure notification signal through flooding.

On the other hand, if its own node is not a node on the standby path corresponding to the active path, the failure of which is detected, the node transmits the received failure notification signal through flooding without switching its switch. Thus, switch setting is performed based on the failure notification signal from the node that has detected the failure, and the transmission terminal node on the standby path finally receives the failure notification signal through flooding. The failure recovery operation is completed when the transmission terminal node on the standby path switches its switch to the standby path.

In the technique disclosed by Patent Literature 1, prior to the reception of the failure notification signal by the transmission terminal node on the active path, each node switches its switch in response to a failure notification signal that is transmitted through flooding from the node that has detected the failure, thus enabling a high-speed failure recovery.

Patent Literature 2 discloses a technique in which a node that has detected a failure refers to a path table to select an alternative route, and transmits a switching request to an upstream branch node over the alternative route, thus enabling a high-speed failure recovery.

Patent Literature 3 discloses a technique in which, when the same path as a path which was used by a selected standby path is routed, a node that has detected the failure does not transmit a failure notification directly to an upstream node(s), but provides an instruction to a downstream node(s) on the overlapped route to transmit the failure notification.

PRIOR ART TECHNICAL DOCUMENTS

Patent Literature

Patent Literature 1: JP2004-304727A
Patent Literature 2: JP2004-297238A
Patent Literature 3: JP2003-124978A

SUMMARY OF INVENTION

Problem to be Solved by the Invention

However, according to Patent Literature 1, a node on an active path that has detected a failure transmits a failure notification signal through flooding, and a node that has received the failure notification signal also transmits the failure notification signal through flooding.

Therefore, there is a possibility that the transmission terminal node on the active path may receive the failure notification signal earlier than other nodes on a standby path, owing to the network configuration. In this case, the transmission terminal node on the active path will switch its switch to the standby path and transmit data to the standby path. This leads to a state in which switch settings are not completed at a certain node(s) on the standby path, thus raising the possibility that the data will be transmitted not to a desired destination, but to undesired destination(s). This is a critical problem in terms of security.

Further, the inventions described in Patent Literatures 2 and 3 merely select a route for bypassing a link at which a failure has occurred, and fail to take into consideration the number of hops from the transmission terminal node that are used after failure recovery.

The present invention has been made in view of the aforementioned problems, and is aimed at reducing as much as possible the number of hops from a transmission terminal node that are used after failure recovery, and also at performing a high-speed and accurate failure recovery.

Means to Solve the Problems

In order to solve the aforementioned problem, a communication system according to the present invention comprising a plurality of node devices each having path switching means for switching a data transmission path, is characterized in that each of said node devices comprises:

failure detection means that detects a failure on a first transmission path over which data transmission is being performed;

transmission path setting means that, when said failure exists in a link or a node that is located immediately before its own node, sets a second transmission path as far as a transmission terminal node, the second transmission path that excludes a path from the transmission terminal node to a node that has detected the failure within the first transmission path;

first failure notification means that transmits a failure notification signal as far as said transmission terminal node over the second transmission path;

new path switching means that, upon receipt of said failure notification signal, switches a switch for data transmission so that a path for new data transmission is the same path as a transmission path for the failure notification signal; and data transmission means that, upon the transmission terminal node receiving the failure notification signal, switches said switch to the second transmission path and performs a new data transmission over the second transmission path.

The communication system is characterized in that the transmission path setting means sets the second transmission path by referring to path information that has been previously stored.

The communication system is characterized in that it comprises failure detection signal transmission means that, when the second transmission path overlaps with part of the first transmission path, transmits a failure detection signal to one or more nodes located downstream of the first transmission path.

The communication system is characterized in that it comprises second failure notification means that, upon receipt of said failure detection signal, transmits a failure notification signal over the second transmission path.

The communication system is characterized in that it comprises: storage means that stores path information of a third transmission path that is used when a failure exists in a link that is located immediately before a receiving terminal node on the first transmission path; wherein, when the failure exists in a link or a node that is located immediately before its own node, the transmission path setting means refers to path information that is stored in said storage means and sets the second transmission path so that a transmission path as far as the transmission terminal node, the second transmission path that excludes a path from said transmission terminal node to the node that detects said failure within the first transmission path and the third transmission path share the same portion.

A node device according to the present invention is a transmission terminal that performs data transmission, and is characterized in that it comprise: data transmission means that, upon receipt of a failure notification signal, switches a switch to a path over which the failure notification signal is received, and performs new data transmission.

A node device according to the present invention is characterized in that it comprises:

failure detection means that detects a failure on a first transmission path over which data transmission is being performed;

transmission path setting means that, when said failure exists in a link or a node that is located immediately before its own node, sets a second transmission path as far as a transmission terminal node, the second transmission path that excludes a path from the transmission terminal node to a node that has detected said failure within the first transmission path;

first failure notification means that transmits a failure notification signal as far as the transmission terminal node over the second transmission path; and new path switching means that, upon receipt of the failure notification signal, switches a switch for data transmission so that a path for new data transmission is the same path as a transmission path for the failure notification signal.

The node device is characterized in that the transmission path setting means sets the second transmission path by referring to path information that has been previously stored.

The node device is characterized in that it comprises failure detection signal transmission means that, when the second transmission path overlaps with part of the first transmission path, transmits a failure detection signal to one or more downstream nodes over the first transmission path.

The node device is characterized in that it comprises second failure notification means that, upon receipt of the failure detection signal, transmits a failure notification signal over the second transmission path.

The node device is characterized in that it comprises: storage means that stores path information for a third transmission path that is used when a failure exists in a link located immediately before a receiving terminal node on the first transmission path; wherein, when said failure exists in a link or a node that is located immediately before its own node, the transmission path setting means refers to path information that is stored in the storage means and sets a second transmission path so that a transmission path as far as a transmission terminal node, the second transmission path that excludes a path from the transmission terminal node to the node that has detected the failure within the first transmission path is shared with the third transmission path.

A communication method in a communication system according to the present invention is characterized in that the method comprises:

a failure detection step of detecting a failure on a first transmission path over which data transmission is being performed;

a transmission path setting step of, when said failure exists in a link or a node that is located immediately before its own node, setting a second transmission path as far as a transmission terminal node, the second transmission path that excludes a path from said transmission terminal node to a node that has detected said failure within the first transmission path;

a first failure notification step of transmitting a failure notification signal as far as the transmission terminal node over the second transmission path;

a new path switching step of, upon receipt of the failure notification signal, switching a switch for data transmission so that a path for new data transmission is the same path as a transmission path for the failure notification signal; and a data transmission step of, upon the transmission terminal node receiving the failure notification signal, switching the switch to the second transmission path and performing a new data transmission over the second transmission path.

The communication method is characterized in that the transmission path setting step sets the second transmission path by referring to path information that has been previously stored.

The communication method is characterized in that it comprises a failure detection signal transmission step of, when the second transmission path overlaps with part of the first transmission path, transmitting a failure detection signal to one or more nodes located downstream of the first transmission path.

The communication method is characterized in that it comprises a second failure notification step of, upon receipt of the failure detection signal, transmitting a failure notification signal over the second transmission path.

The communication method is characterized in that it comprises:

storage means that stores path information of a third transmission path that is used when a failure exists in a link that is located immediately before a receiving terminal node on the first transmission path;

wherein, when the failure exists in a link or a node that is located immediately before its own node, the transmission path setting step refers to path information that is stored in the storage means and sets said second transmission path so that a transmission path as far as the transmission terminal node, the second transmission path that excludes a path from said transmission terminal node to the node that detects the failure within the first transmission path and the third transmission path share the same portion.

A computer program according to the present invention is characterized in that it causes a computer to execute the communication method in a communication system.

Effects of the Invention

According to the present invention, by selecting an alternative route as far as a transmission terminal node that excludes a path from the transmission terminal node on a path along which transmission has been performed to a node that has detected a failure, the number of hops that are used after failure recovery can be reduced as much as possible, and failure recovery can be performed at a high speed and accurately.

BRIEF DESCRIPTION OF THE DRAWINGS

FIG. 10 is a sequence chart relating to operations within a network according to an exemplary embodiment of the present invention.

FIG. 11 is a view that illustrates a case in which part of a newly operated path overlaps with a active path.

EMBODIMENTS FOR CARRYING OUT THE INVENTION

Best modes for implementing the present invention will be hereinafter described in detail with reference to the attached drawings.

(First Exemplary Embodiment)

Figure 2:
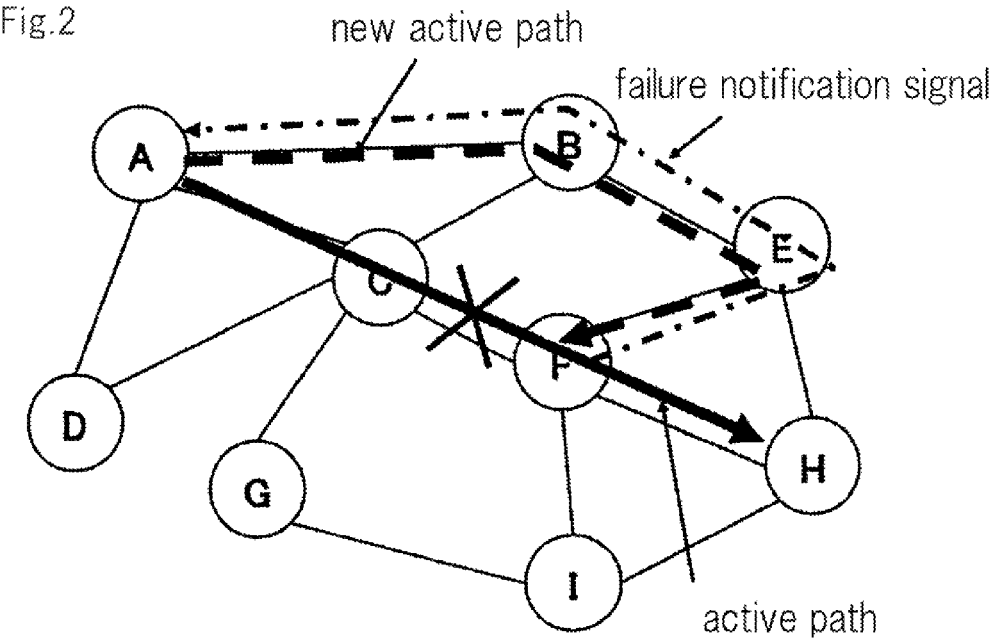
FIG. 2 is a view that illustrates a network.

FIG. 2 is a view that illustrates an example of a network. There exist nodes A to I in this network, and a plurality of links are connected to each node.

Figure 1:
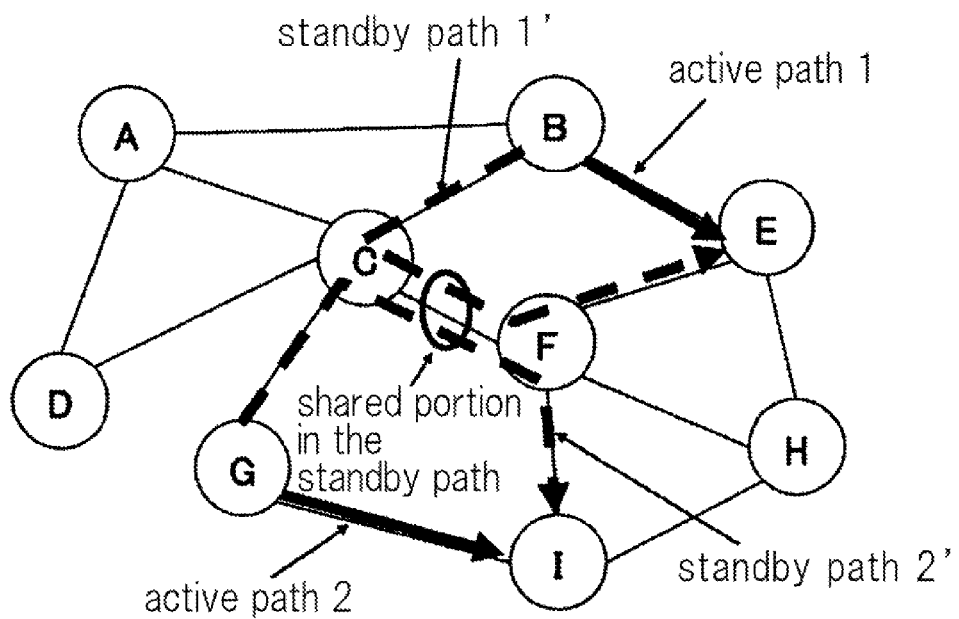
FIG. 1 is a view that illustrates an example in a case where part of a standby path is shared by a plurality of active paths.

Data transmission is usually performed on an active path indicated by a thick line in FIG. 1. However, when a failure, such as a link disconnection or a node failure, occurs on the active path, data transmission is performed via a new active path indicated by a dotted line in FIG. 1. In addition to data signals that are used for data transmission on the active path or new active path, there are control signals such as failure notification signals that are used for controlling each node. The signals are transmitted using different channels. Herein, the signals are transmitted using the same channel on the active path and the new active path. In this connection, FIG. 2 illustrates a case in which a failure occurred between nodes C and F.

Figure 3:
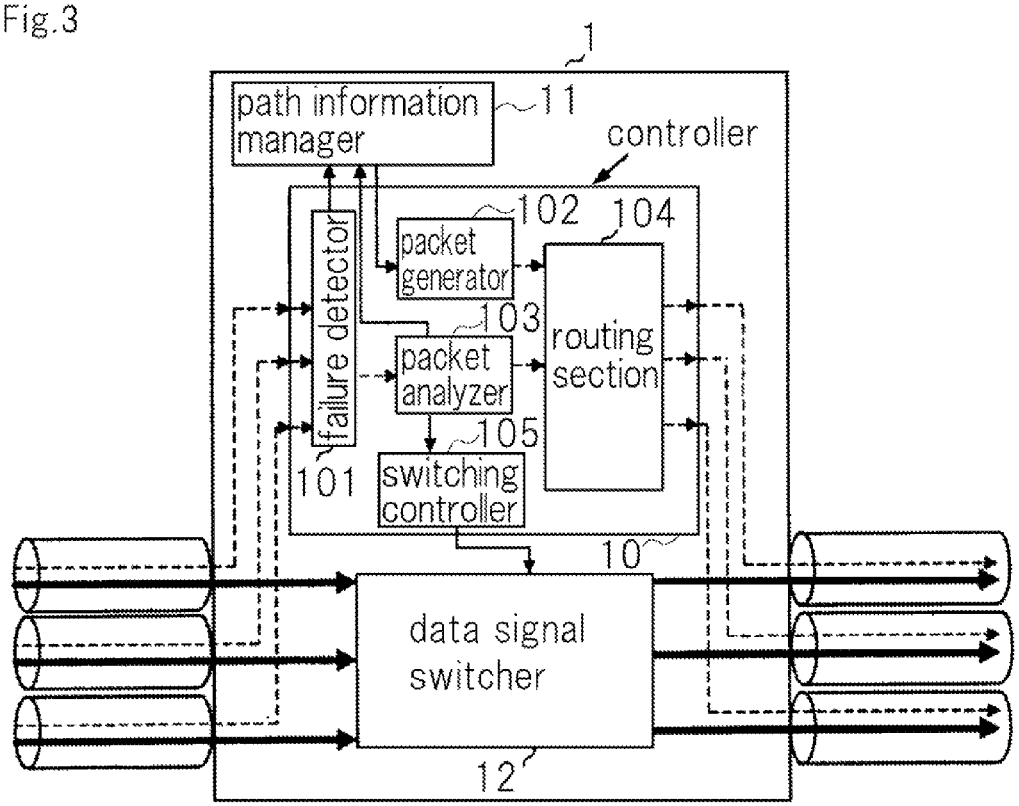
FIG. 3 is a block diagram of a node.

FIG. 3 is a block diagram that illustrates the configuration of a node in the network. Node 1 comprises controller 10, path information manager 11, and data signal switcher 12.

Controller 10 handles control signals, and comprises failure detector 101, packet generator 102, packet analyzer 103, routing section 104, and switching controller 105.

Path information manager 11 manages information as to active paths and information as to new active paths that are used when a failure occurs. Data signal switcher 12 handles data signals.

Failure detector 101 performs detection of failures. Packet generator 102 generates a packet for a control signal. Packet analyzer 103 performs analysis of packets. Routing section 104 outputs a packet to an output destination of the packet. Switching controller 105 performs switching control in data signal switcher 12.

Figure 4:
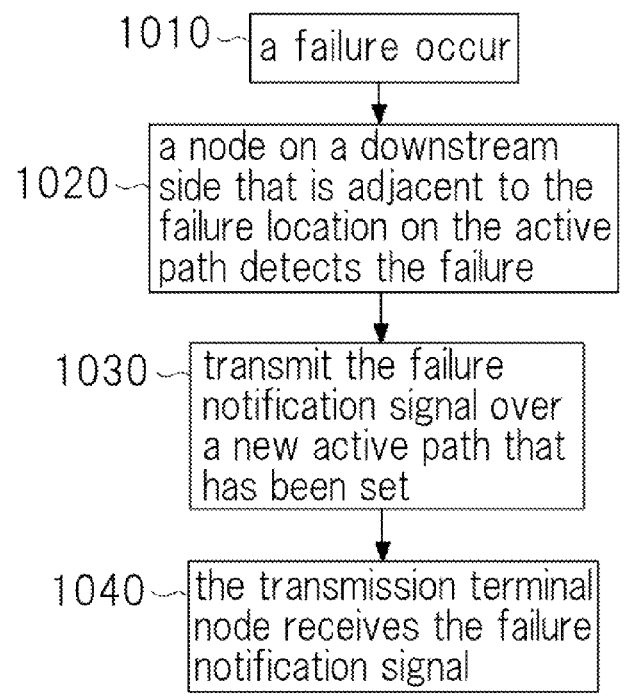
FIG. 4 is a flowchart that illustrates an example of operations within the network when a failure has occurred.

Next, an example of operations in the first exemplary embodiment will be described. FIG. 4 is a flowchart that illustrates an example of operations within the network when a failure has occurred.

When a failure such as a link disconnection or a node failure occurs on a active path at step 1010, a node on a downstream side that is adjacent to the failure location detects the failure at step 1020. The "node on a downstream side that is adjacent to the failure location" herein refers to a node that is located immediately after the location where the failure has occurred, on the downstream side thereof, on the active path.

At step 1030, the node that has detected the failure generates a failure notification signal, and transmits the failure notification signal along a new active path that has been set. At step 1040, the transmission terminal node of the active path finally receives the failure notification signal.

The "new active path" herein indicates a path from the failure detection node to the transmission terminal node excluding the path on which the failure is detected on the active path. That is, the new active path is a path from the failure detection node to the transmission terminal node that the failure detection node sets by bypassing the failure detection location. In this connection, the new active path may be the shortest path that excludes the path of the active path on the upstream side of the failure detection node. In the first to the third exemplary embodiments, the new active path is described as the shortest path from the failure detection node to the transmission terminal node that excludes the failure location.

According to the present exemplary embodiment, it is possible to switch a data signal that is being sent out to an active path, to a new active path.

Figure 5:
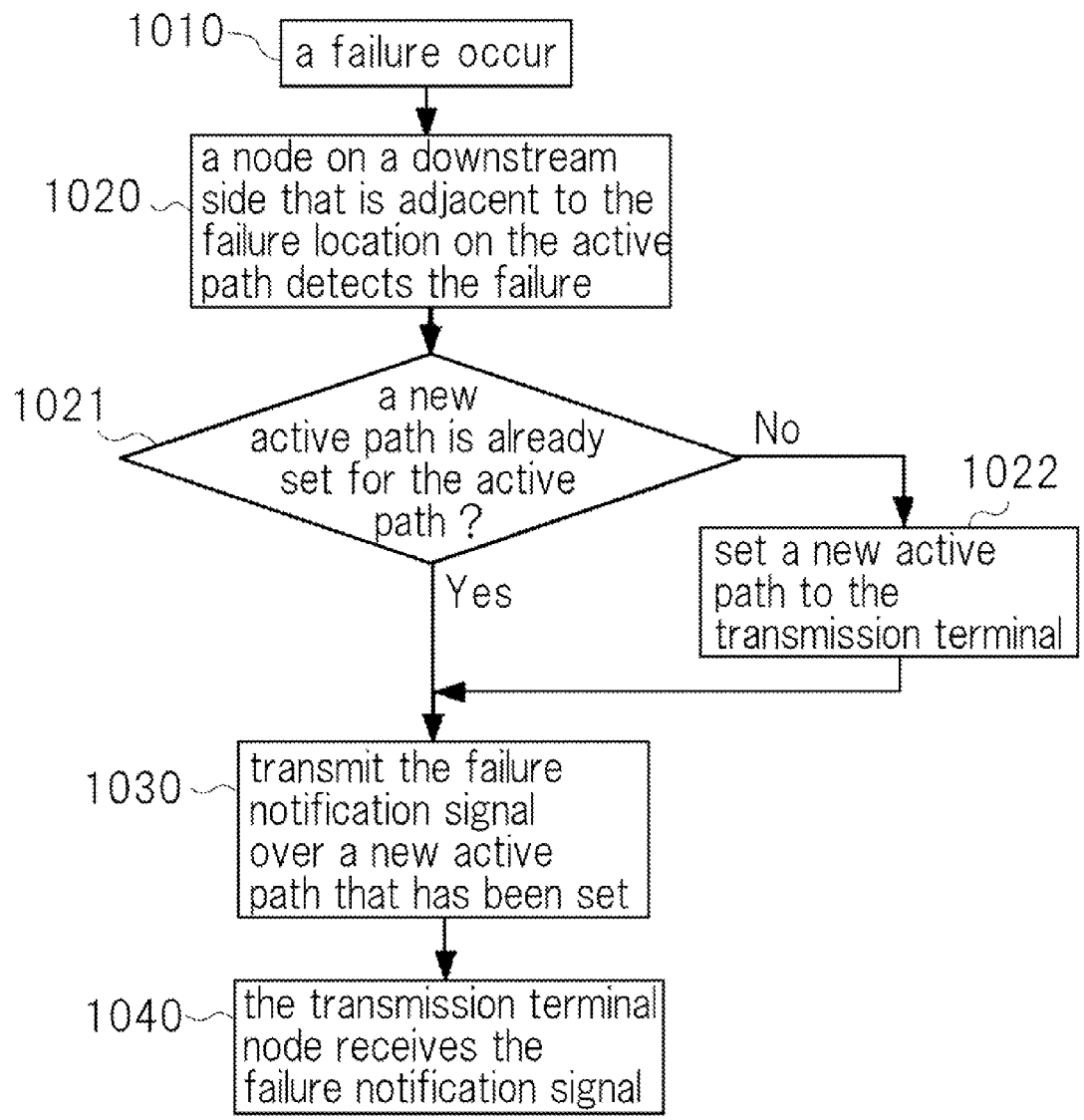
FIG. 5 is a flowchart in which operations of confirming settings of and setting a new active path are added to the flowchart shown in FIG. 4.

In the aforementioned flowchart, a new active path is described as a previously set path as illustrated in FIG. 2. However, the new active path may not be previously set. FIG. 5 is a flowchart when confirming setting of a new active path.

When a failure such as a link disconnection or a node failure occurs in an active path at step 1010, a node on a downstream side that is adjacent to the failure location detects the failure at step 1020.

At step 1021, the node determines whether or not a new active path is already set for the active path. If a new active path is not set, at step 1022, the node sets a path from the failure detection node to the transmission terminal of the active path, and thereafter the process advances to step 1030. If the node determines that a new active path is set, the process advances directly to step 1030. At step 1030, the node that has detected the failure generates a failure notification signal and transmits the failure notification signal along the new active path that is set. At step 1040, the transmission terminal node on the active path finally receives the failure notification signal.

Operations of the failure detection node to confirm whether or not a new active path for the active path is already set at will be hereinafter described in detail.

Figure 6:
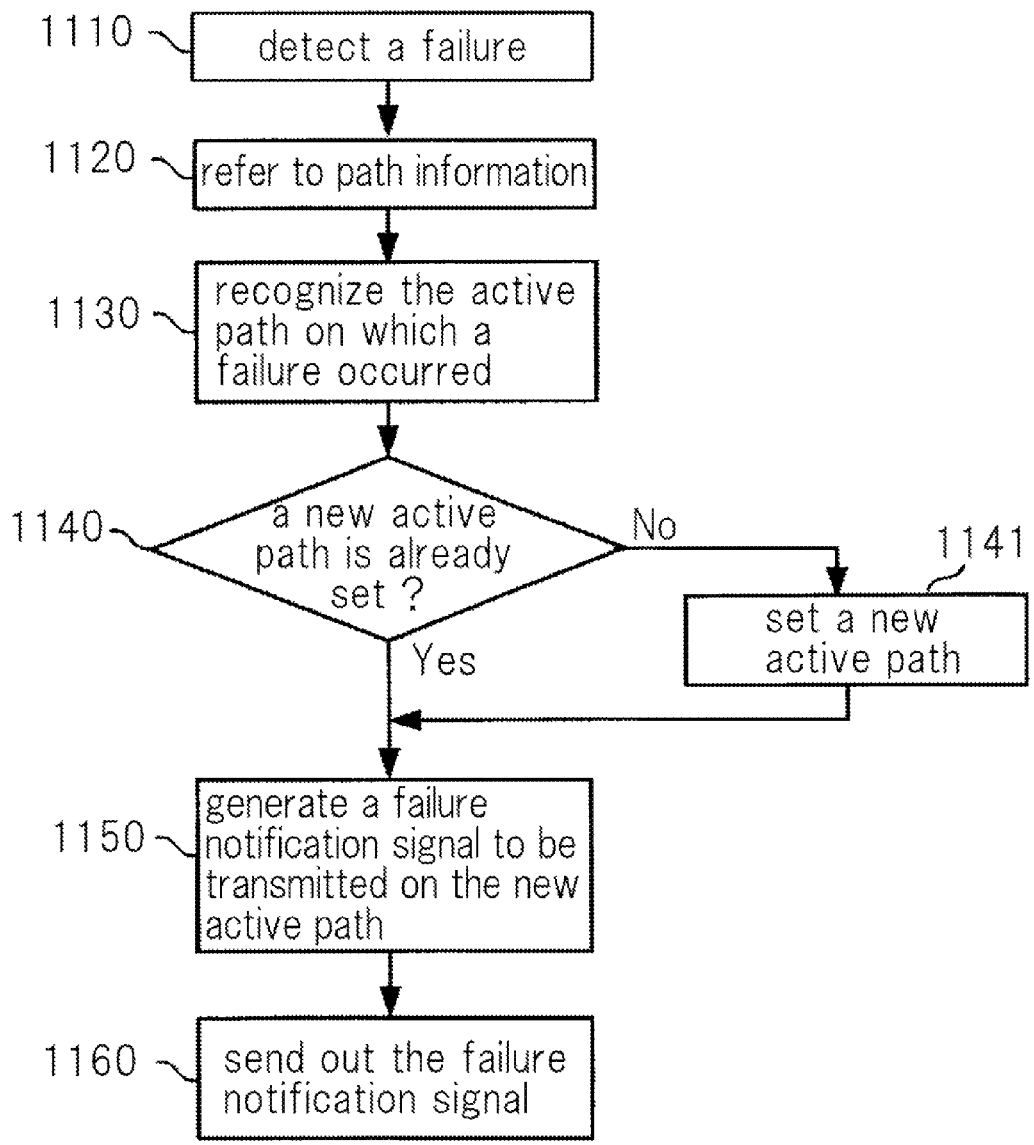
FIG. 6 is a flowchart that illustrates an example of operations of a node that has detected a failure.

FIG. 6 is a flowchart that illustrates an example of operations of a node that has detected a failure. At step 1110, a node on the active path detects a loss of a control signal at failure detector 101 in controller 10. At step 1120, the node that has detected the failure refers to path information manager 11. At step 1130, the node that has detected the failure recognizes tan active path on which the failure has occurred.

Subsequently, at step 1140, the failure detection node refers to path information manager 11 to determine whether or not a new active path is already set for the active path. If a new active path is not set, the failure detection node searches for the shortest path from the failure detection node to the transmission terminal node on the active path, and sets the shortest path as the new active path at step 1141. Here, the path of the active path on the upstream side of the failure detection node is excluded from the search.

When the new active path is already set or when the failure detection node has set the new active path, packet generator 102 in the failure detection node generates at step 1150 a packet for a failure notification signal so as to perform transmission thereof along the new active path, and at step 1160 transmits the packet for the failure notification signal.

Figure 7:
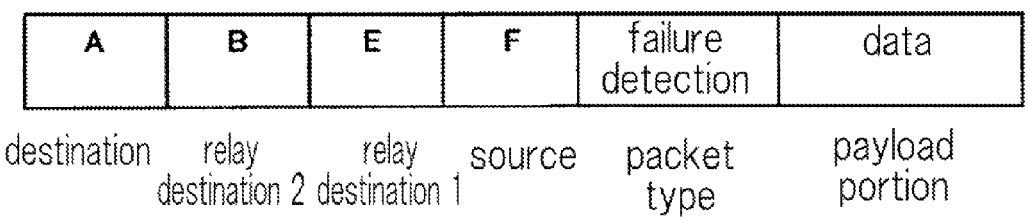
FIG. 7 is a view that illustrates an example of a packet for a failure notification signal.

The packet for the failure notification signal that is generated at step 1150 will now be described in detail. FIG. 7 illustrates a packet for a failure notification signal that is generated in the network shown in FIG. 2.

Information in the packet is set such that the packet is transmitted along the new active path from node F that has detected a failure as a source to node A as a destination via nodes E and B. Specifically, routing section 104 routes the packet towards a node that is a relay destination of the packet.

In the example illustrated in FIG. 7, routing section 104 in failure detection node F routes the packet towards relay destination node E. Further, simultaneously with the transmission of the packet for the failure notification signal, the failure detection node switches the input port of the data signal switcher from a port through which signals of the active path are being input to a port through which signals of the new active path are input, by means of switching controller 105.

According to the present exemplary embodiment, since a failure notification signal is transmitted in sequence to the transmission terminal node on the active path along a new active path from an adjacent node that detects the failure, each node is capable of switching its switch at the time it receives the failure notification signal. Accordingly, operations to switch a data signal from a active path to a new active path can be performed at high speed and accurately.

(Second Exemplary Embodiment)

Operations when a node on a new active path receives a failure notification signal will now be described in detail. Note that the configuration of the present exemplary embodiment is the same as that of the first exemplary embodiment.

Figure 8:
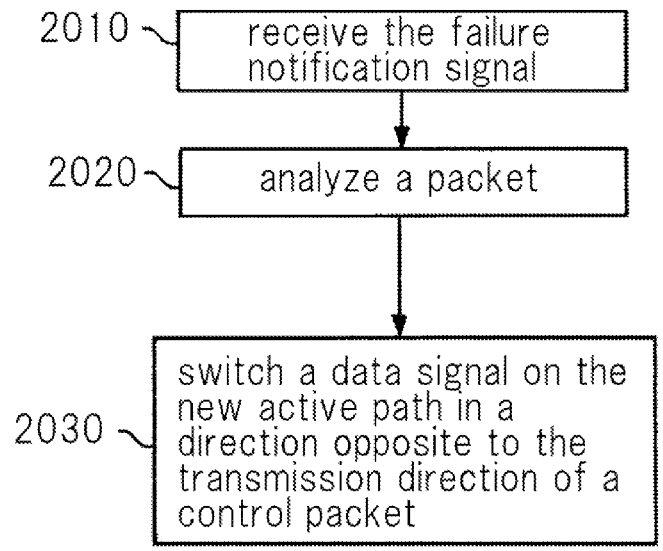
FIG. 8 is a flowchart that illustrates an example of operations when a node on a new active path receives a failure notification signal.

FIG. 8 is a flowchart that illustrates an example of operations when a node on a new active path has received a failure notification signal.

When a node on a new active path receives a failure notification signal at step 2010, packet analyzer 103 analyzes the packet for the failure notification signal, and recognizes that the packet is for a failure notification signal at step 2020. At the same time, packet analyzer 103 recognizes the input port and output port in the packet. Next, at step 2030, packet analyzer 103 sets the input port and output port of data signal switcher 12 in the direction opposite to the transmission direction of the control packet through switching controller 105.

Figure 9:
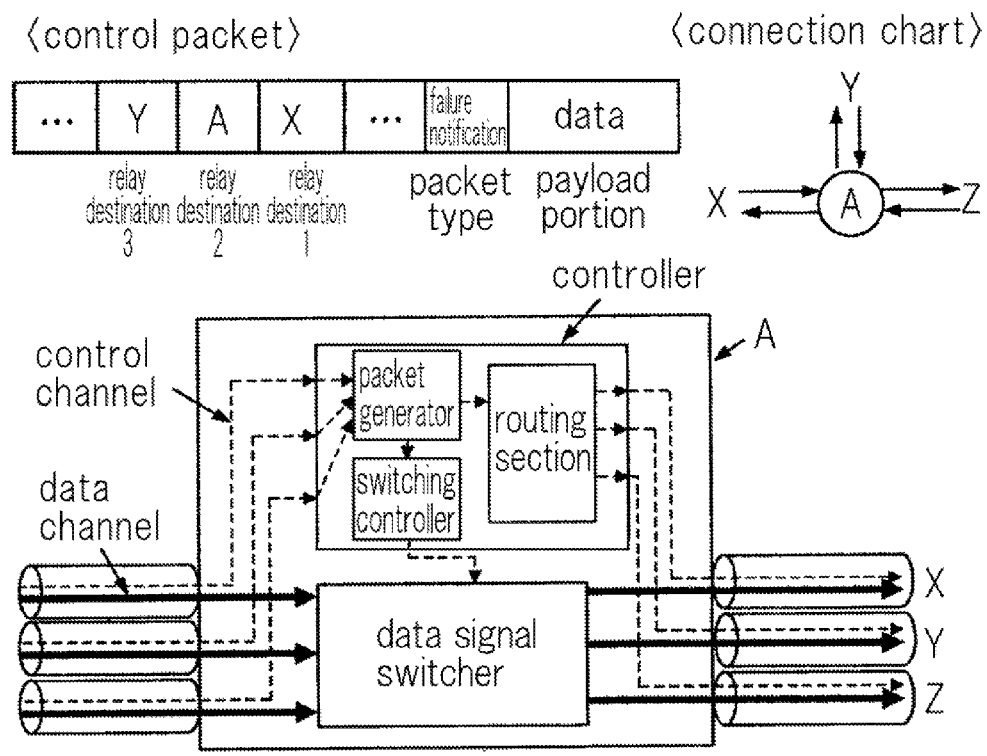
FIG. 9 is a view that illustrates node A on a newly operated path, the relationship between node A and nodes adjacent thereto, and a received control packet.

FIG. 9 illustrates node A on the new active path, the relationship between node A and nodes adjacent thereto, and a received control packet. Herein, it is assumed that node A is not related to node A shown in FIG. 2. In the example illustrated in FIG. 9, packet analyzer 103 recognizes the packet is a failure notification signal based on a control packet and, as shown by the dashed line, recognizes that the input port of the packet is connected to node X and the output port thereof is connected to node Y.

Subsequently, the input port of the data signal is set to connect to node Y and the output port is set to connect to node X so as to be opposite to the transmission direction of the control packet as indicated by the thick line in the drawing.

FIG. 10 is a sequence chart for operations in the network according to the present exemplary embodiment. According to this sequence, when a failure occurs at a link that is immediately before node F, node F detects the failure at step 2110, sets a new active path at step 2120, transmits a failure notification signal at step 2130, and switches a switch at step 2140.

Node E that has received the failure notification signal transmits the failure notification signal to node B at step 2150, and switches its switch to the opposite direction at step 2160. Likewise, at step 2170, node B transmits the failure notification signal to node A that is the transmission terminal node, and switches its switch at step 2180.

Transmission terminal node A that has received the failure notification signal switches its switch with the reception of the failure notification signal as a trigger at step 2190, and newly transmits data at step 2200.

Since data transmission as well as reception of the failure notification signal by transmission terminal node A are thus possible, high speed and accurate failure recovery is possible.

According to the present exemplary embodiment, nodes on a new active path sequentially perform switching of ports. Consequently, when the transmission terminal node on the active path finally receives the failure notification signal, setting of a data signal switcher will have been completed at all nodes on the new active path except the transmission terminal node.

Since the transmission terminal node performs transmission of new data with the reception of the failure notification signal as a trigger, data transmission on a new active path can be immediately performed. Accordingly, failure recovery can be performed at high speed and accurately.

(Third Exemplary Embodiment)

When setting a new active path from a node that detected a failure of a node adjacent thereto, there is a possibility that part of the new active path will overlap with the active path, as illustrated in FIG. 11. Therefore, according to the present exemplary embodiment, from the viewpoint of effective band utilization, setting of a new active path is performed such that paths do not overlap. Note that the configuration of the present exemplary embodiment is the same as that of the first exemplary embodiment.

Figure 12:
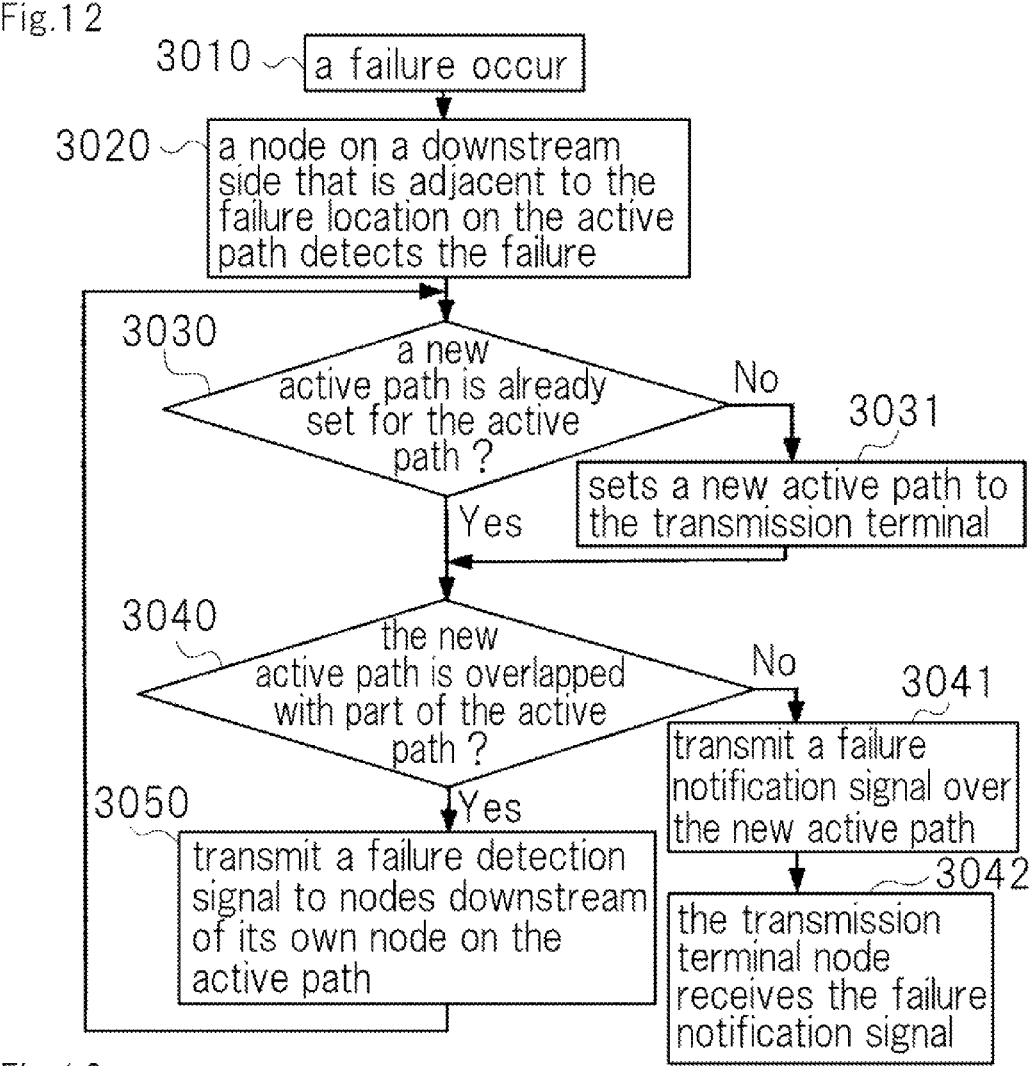
FIG. 12 is a flowchart that illustrates an example of operations within the network when a failure has occurred according to a third exemplary embodiment.

FIG. 12 is a flowchart in the third exemplary embodiment that illustrates an example of operations in the network when a failure has occurred. The operations up to setting a new active path (step 3010 to step 3031) are the same as in the first exemplary embodiment.

After setting the new active path, the node that has detected the failure determines whether or not part of the new active path overlaps with the active path, at step 3040. If the paths do not overlap, similarly to the first exemplary embodiment, the failure detection node generates a failure notification signal at step 3041, and transmits the failure notification signal along the new active path that has been set, at step 3042.

On the other hand, if part of the new active path overlaps with the active path, then the node that has detected the failure does not perform data transmission using the new active path as it is, instead transmits a failure detection signal to downstream nodes on the new active path that overlaps with the active path, at step 3050.

The downstream node that has received the failure detection signal returns its processing to the processing of step 3030, and continues to perform its processing until part of the new active path no longer overlaps with the active path at step 3040. Finally, at steps 3041 and 3042, a failure notification signal is transmitted along the new active path from a node at which part of the new active path and the active path do not overlap each other, and the transmission terminal node on the active path receives the failure notification signal. This makes it possible to switch a data signal that is being sent out to the active path to the new active path.

Figure 13:
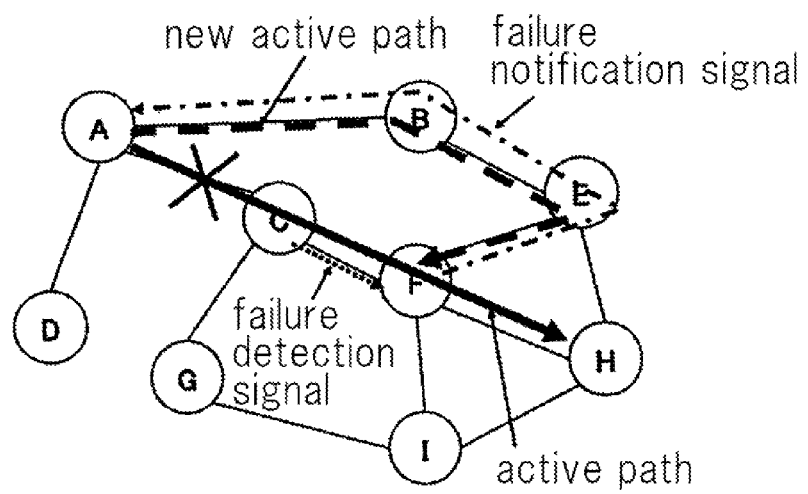
FIG. 13 is a view that illustrates a active path, a newly operated path, and the flow of a failure notification signal and a failure detection signal.

FIG. 13 illustrates an active path, a new active path, and the flow of a failure notification signal and a failure detection signal. Node C detects a failure, and since part of the new active path overlaps with the active path as shown in FIG. 11, node C transmits a failure detection signal to node F which is a node located downstream of node C.

Since part of the new active path does not overlap with the active path at node F, node F transmits a failure notification signal along the new active path, which is finally received by node A that is the transmission terminal node on the active path.

Figure 14:
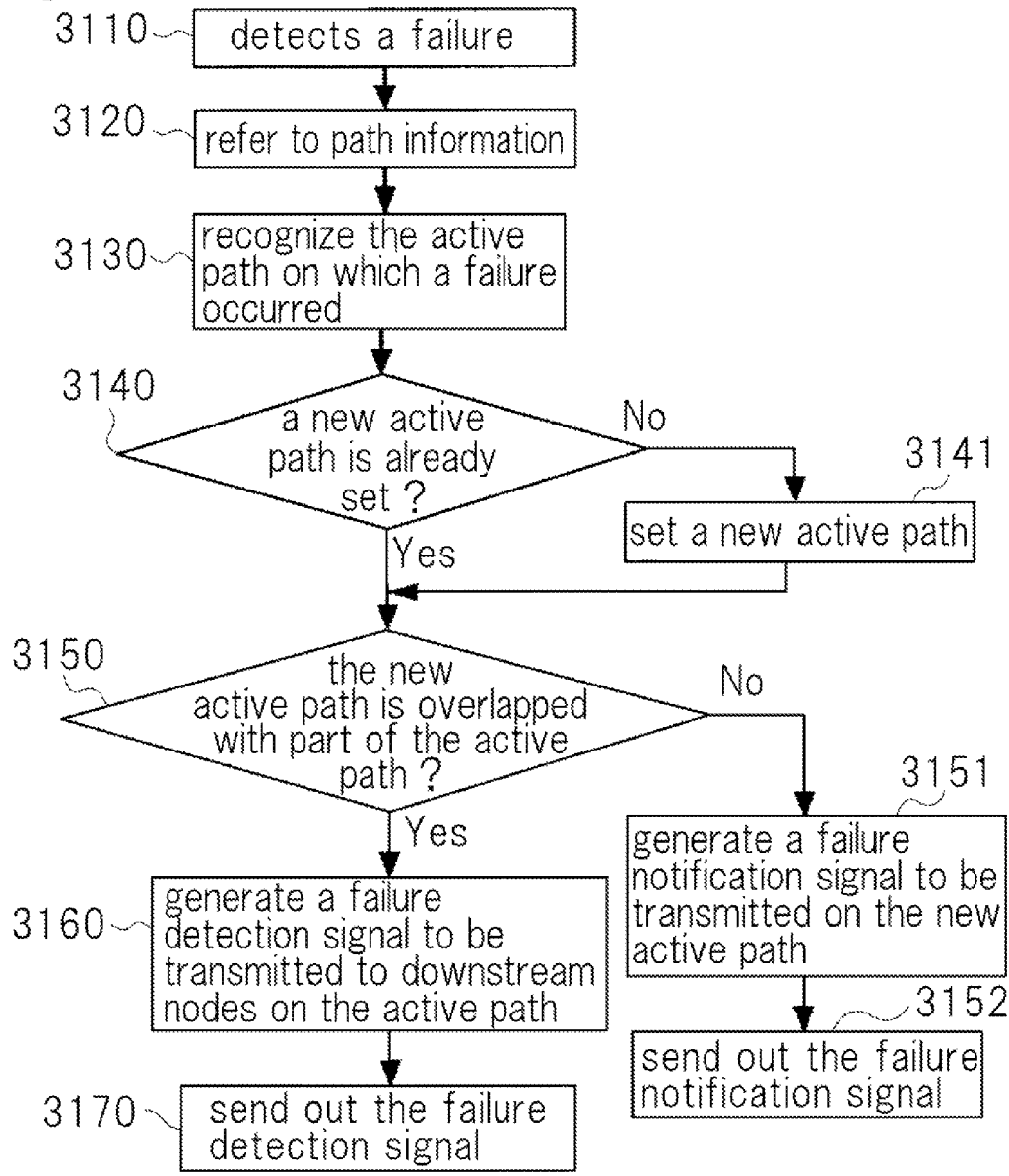
FIG. 14 is a flowchart that illustrates an example of operations of a node that has detected a failure according to the third exemplary embodiment.

FIG. 14 is a flowchart in the third exemplary embodiment that illustrates an example of operations of a node that has detected a failure. The operations up to setting of the new active path (steps 3110 to 3141) are the same as in the first exemplary embodiment.

After setting the new active path, the node that has detected the failure refers to path information manager 11 in the node to check whether or not part of the new active path overlaps with the active path, at step 3150. If the paths do not overlap each other, similarly to the first exemplary embodiment, the failure detection node generates a packet for a failure notification signal so as to perform transmission along the new active path by means of packet generator 102 in the failure detection node, at step 3151. After generating the packet, routing section 104 sends out the packet for the failure notification signal at step 3152.

On the other hand, if part of the new active path overlaps with the active path, then packet generator 102 in the failure detection node generates a packet for a failure detection signal at step 3160. After generating the packet, routing section 104 sends out the packet for the failure notification signal at step 3170.

Figure 15:
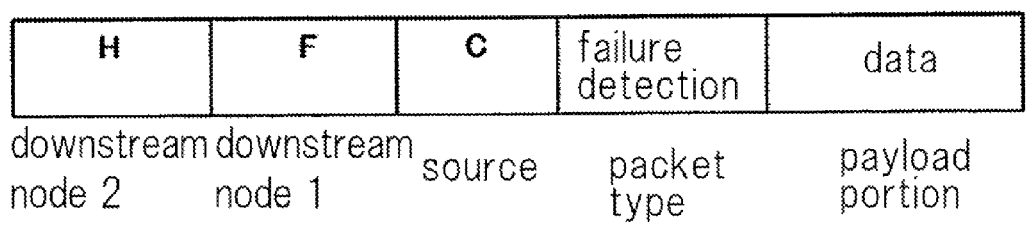
FIG. 15 is a view that illustrates an example of a packet of a failure detection signal.

FIG. 15 is a view that illustrates an example of a packet for the failure detection signal generated at step 3170. This example is based on the active path shown in FIG. 13. Node C that has detected the failure is a source, and information in the packet is set so that it is transmitted to nodes F and H that are located downstream of node C. Note that information on the active path, the failure of which is detected, may also be set in the packet.

Figure 16:
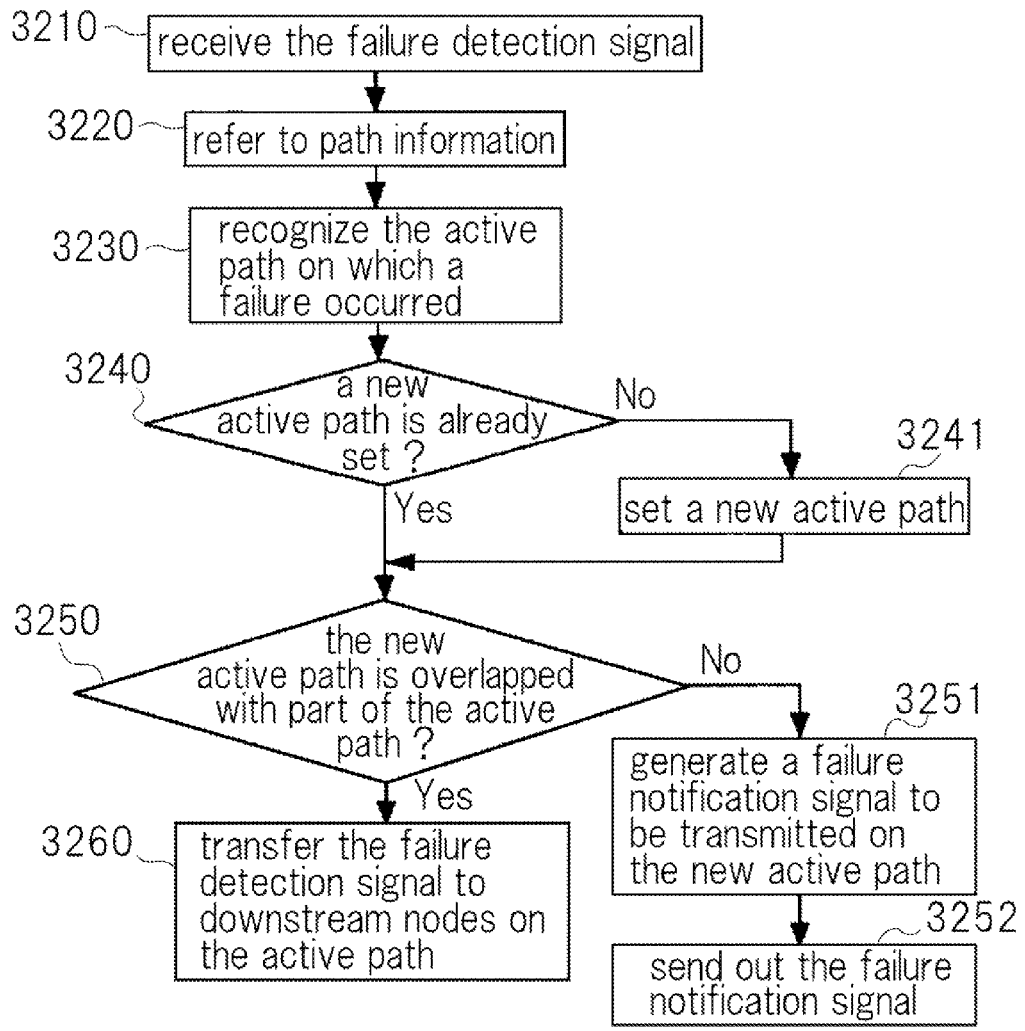
FIG. 16 is a flowchart that illustrates an example of operations of a downstream node that has received a failure detection signal.

FIG. 16 is a flowchart that illustrates an example of operations of a downstream node(s) that has (have) received the failure detection signal. A node on the downstream side that has received the failure detection signal analyzes the packet for the failure detection signal by means of packet analyzer 103. Packet analyzer 103 recognizes that the packet is for a failure detection signal at step 3210. Packet analyzer 103 refers to path information manager 11 at step 3220, to recognize the active path, the failure of which is detected, based on the information in path information manager 11 and the failure detection signal.

The node that has received the failure detection signal continuously refers to path information manager 11 to determine whether or not a new active path has already been set from its own node at step 3240. If a new active path is not set, then the node that has received the failure detection signal searches for the shortest path from the node that has received the failure detection signal to the transmission terminal node on the active path, and sets a new active path at step 3241.

After the new active path is set, the node that received the failure detection signal again refers to path information manager 11 to determine whether or not part of the new active path overlaps with the active path at step 3250. If the paths do not overlap with each other, packet analyzer 103 discards the packet for the failure detection signal, packet generator 102 generates a packet for a failure notification signal so as to perform transmission along the new active path at step 3151, and subsequently, routing section 104 sends out the packet for the failure notification signal at step 3152.

On the other hand, if part of the new active path overlaps with the active path, then packet analyzer 102 transmits the packet for the failure detection signal to routing section 104, and routing section 104 transfers the packet to the transfer destination at step 3260. For example, in FIG. 15, node F receives the failure detection signal, and if part of the new active path from node F overlaps with the active path, the failure detection signal is transferred to node H.

According to the present exemplary embodiment, a failure notification signal is transmitted via a new active path so that part of the new active path may not overlap with the active path, making it possible to reduce the band used for the new active path to thereby efficiently utilize the network band.
(Fourth Exemplary Embodiment)

The present exemplary embodiment is aimed at reducing the band for use in a new active path by utilizing a methology that is different from that of the third exemplary embodiment.

Figure 17:
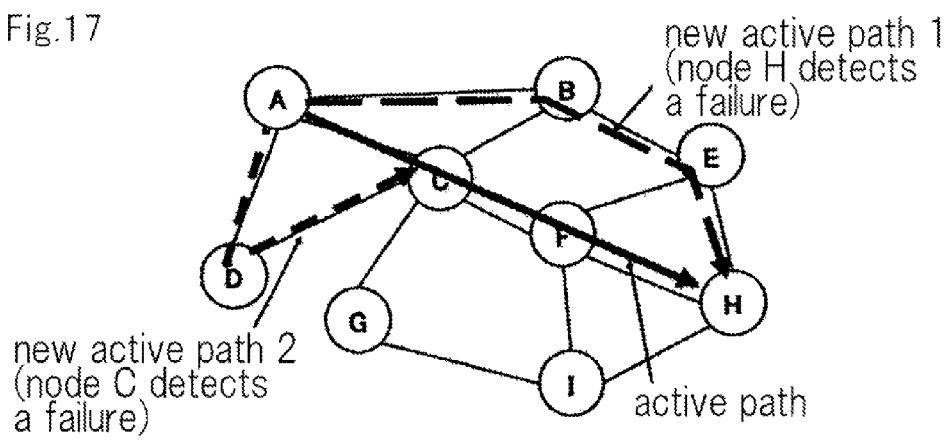
FIG. 17 is a view that illustrates two newly operated paths for a active path.

FIG. 17 illustrates two new active paths (new active path 1 and new active path 2) for an active path. New active path 1 and new active path 2 are herein formed by different paths. There is the possibility that this phenomenon occurs when the path of new active path 1 is taken as the shortest path that excludes the active path on the upstream side of the failure detection node. In such a case, if new active path 2 can be set so that the same path is shared by new active path 1 and new active path 2, as shown in FIG. 18, there is the possibility that the band can be effectively utilized.

Parts of the configuration and operations of the fourth exemplary embodiment that are different from the first exemplary embodiment will now be described in detail.

In the present exemplary embodiment, path information manager 11 in an intermediate node on the active path retains path information on new active path 1 that is used when a receiving terminal node on the active path detects a failure.

Figure 18:
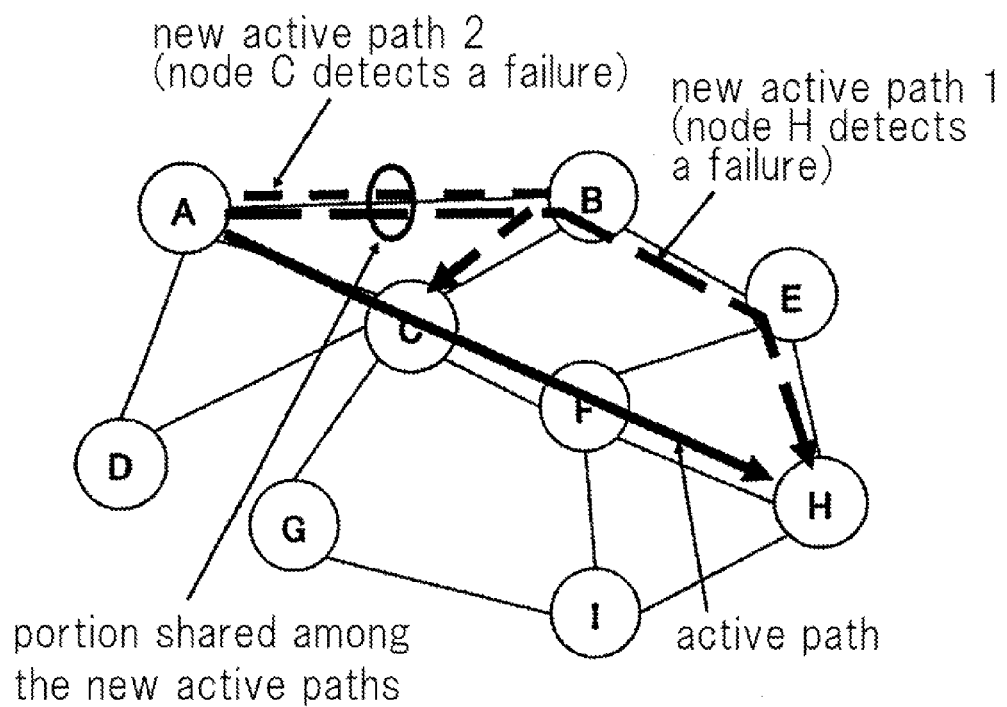
FIG. 18 is a view that illustrates an example in which part of two newly operated paths share a path.

For example, path information on new active path 1 that is used when node H detects a failure in FIG. 18 is retained by path information manager 11 in intermediate nodes C and F on the active path. With respect to new active path 2, the shortest path from an intermediate node on the active path to an intermediate node on new active path 1 is set as part of new active path 2 from the intermediate node based on the information retained in path information manager 11, and the remaining path of new active path 2 is shared with new active path 1. In FIG. 18, a path at the link between nodes A and B is shared by new active paths 1 and 2.

According to the present exemplary embodiment, there is the possibility of effectively utilizing a band by setting new active paths so that part of the respective paths is shared. Further, by combining the present exemplary embodiment with the third exemplary embodiment, there is the possibility that a band can be utilized even more effectively.

Although the present invention has been described above referring to exemplary embodiments, the present invention is not limited to the foregoing exemplary embodiments. Various changes and modifications that can be understood by one skilled in the art may be made to the configuration and details of the present invention without departing from the spirit or scope of the present invention.

This application is the National Phase of PCT/JP2009/066237, filed Sep. 17, 2009, which claims the benefit of Japanese Application No. 2008-259007 filed in Japan on Oct. 3, 2008, the entire contents of which are incorporated herein by this reference.

EXPLANATION OF REFERENCE SYMBOLS 1 node
10 controller
11 path information manager
12 data signal switcher
101 failure detector
102 packet generator
103 packet analyzer
104 routing section
105 switching controller

The invention claimed is:
1. A communication system comprising a plurality of node devices,
  wherein each of said plurality of node devices comprises a controller configured to:
  detect a failure on a first transmission path over which data transmission is being performed;
  when said failure exists in a link or a node that is located immediately before its own node, set a single second transmission path as far as a transmission terminal node, said second transmission path that excludes a path from said transmission terminal node to a node that has detected said failure within said first transmission path;
  transmit a first failure notification signal as far as said transmission terminal node over said second transmission path;
  upon receipt of said first failure notification signal, switch a switch instantly for data transmission so that a path for new data transmission is the same path as a transmission path for said first failure notification signal; and
  upon said transmission terminal node receiving said first failure notification signal, switch said switch to said second transmission path and perform a new data transmission over said second transmission path, wherein
  when said second transmission path overlaps with part of said first transmission path, transmit a second failure notification signal, different from the first notification signal, to one or more nodes located downstream of said first transmission path, and
  upon receipt of said second failure notification signal at a junction node where overlapping between the first transmission path and the second transmission ends, transmit said first failure notification signal from the junction node over said second transmission path.

2. The communication system according to claim 1, wherein said controller is configured to set said second transmission path by referring to path information that has been previously stored.

3. The communication system according to claim 1, wherein each of said node devices further comprises:
 path information manager that stores path information of a third transmission path that is used when a failure exists in a link that is located immediately before a receiving terminal node on said first transmission path;
 wherein, when said failure exists in a link or a node that is located immediately before its own node, said controller refers to path information that is stored in said path information manager and sets said second transmission path so that a transmission path as far as said transmission terminal node, said second transmission path that excludes a path from said transmission terminal node to the node that detects said failure within said first transmission path and said third transmission path share the same portion.

4. A node device comprising a controller configured to:
 detect a failure on a first transmission path over which data transmission is being performed;
 when said failure exists in a link or a node that is located immediately before its own node, set a single second transmission path as far as a transmission terminal node, said second transmission path that excludes a path from the transmission terminal node to a node that has detected said failure within said first transmission path;
 transmit a first failure notification signal as far as said transmission terminal node over said second transmission path; and
 upon receipt of said first failure notification signal, switch a switch instantly for data transmission so that a path for new data transmission is the same path as a transmission path for said first failure notification signal, wherein
 when said second transmission path overlaps with part of said first transmission path, transmit a second failure notification signal, different from the first notification signal, to one or more downstream nodes over said first transmission path, and
 upon receipt of said second failure notification signal at a junction node where overlapping between the first transmission path and the second transmission ends, transmit said first failure notification signal from the junction node over said second transmission path.

5. The node device according to claim 4, wherein said controller is configured to set said second transmission path by referring to path information that has been previously stored.

6. The node device according to claim 4, wherein it further comprises:
 path information manager that stores path information for a third transmission path that is used when a failure exists in a link that is located immediately before a receiving terminal node on said first transmission path;
 wherein, when said failure exists in a link or a node that is located immediately before its own node, said controller refers to path information that is stored in said path information manager and sets a second transmission path so that a transmission path as far as a transmission terminal node, said second transmission path that excludes a path from the transmission terminal node to the node that has detected said failure within said first transmission path is shared with said third transmission path.

7. A communication method in a communication system comprising:
 detecting a failure on a first transmission path over which data transmission is being performed;
 when said failure exists in a link or a node that is located immediately before its own node, setting a single second transmission path as far as a transmission terminal node, said second transmission path that excludes a path from said transmission terminal node to a node that has detected said failure within said first transmission path;
 transmitting a first failure notification signal as far as said transmission terminal node over said second transmission path;
 upon receipt of said first failure notification signal, switching a switch instantly for data transmission so that a path for new data transmission is the same path as a transmission path for said first failure notification signal; and
 upon said transmission terminal node receiving said failure notification signal, switching said switch to said second transmission path and performing a new data transmission over said second transmission path, wherein
 when said second transmission path overlaps with part of said first transmission path, transmitting a second failure notification signal, different from the first notification signal, to one or more nodes located downstream of said first transmission path, and
 upon receipt of said second failure notification signal at a junction node where overlapping between the first transmission path and the second transmission ends transmitting said first failure notification signal from the junction node over said second transmission path.

8. The communication method according to claim 7, wherein said setting a second transmission path includes setting said second transmission path by referring to path information that has been previously stored.

9. The communication method according to claim 7,
 wherein, when said failure exists in a link or a node that is located immediately before its own node, said setting a second transmission path includes referring to path information that is stored in a path information manager and setting said second transmission path so that a transmission path as far as said transmission terminal node, said second transmission path that excludes a path from said transmission terminal node to the node that detects said failure within said first transmission path and a third transmission path share the same portion, said path information manager storing path information of said third transmission path that is used when a failure exists in a link that is located immediately before a receiving terminal node on said first transmission path.

10. A non-transitory computer readable medium embedded with a computer program product comprising computer executable code, which when executed, causes a computer to execute:
 detecting a failure on a first transmission path over which data transmission is being performed;
 when said failure exists in a link or a node that is located immediately before its own node, setting a single second transmission path as far as a transmission terminal node, said second transmission path that excludes a path from said transmission terminal node to a node that has detected said failure within said first transmission path;
 transmitting a failure notification signal as far as said transmission terminal node over said second transmission path;
 upon receipt of said failure notification signal, switching a switch instantly for data transmission so that a path for new data transmission is the same path as a transmission path for said failure notification signal; and upon said transmission terminal node receiving said failure notification signal, switching said switch to said second transmission path and performing a new data transmission over said second transmission path, wherein when said second transmission path overlaps with part of said first transmission path, transmitting a second failure notification signal, different from the first notification signal, to one or more nodes located downstream of said first transmission path, and upon receipt of said second failure notification signal at a junction node where overlapping between the first transmission path and the second transmission ends, transmitting said first failure notification signal from the junction node over said second transmission path.

* * * * *